CLIFFORD J. HELMS
INVENTOR

BY Lindenberg & Freilich

ATTORNEYS

April 7, 1970 C. J. HELMS 3,505,544

LINEAR MOTOR

Filed Feb. 9, 1968 2 Sheets-Sheet 2

CLIFFORD J. HELMS
INVENTOR

BY
[signature]
ATTORNEYS

United States Patent Office 3,505,544
Patented Apr. 7, 1970

3,505,544
LINEAR MOTOR
Clifford J. Helms, Woodland Hills, Calif., assignor to Data Products Corporation, Culver City, Calif., a corporation of Delaware
Filed Feb. 9, 1968, Ser. No. 704,291
Int. Cl. H02k 41/00
U.S. Cl. 310—13 14 Claims

ABSTRACT OF THE DISCLOSURE

A linear motor capable of providing a reasonably long stroke and rapid acceleration. The motor is comprised of a core structure defining an air gap around a central leg. Means are provided for developing a substantially uniform magnetic field through the gap. A substantially rigid drive coil structure is concentrically disposed around the central leg with the turns thereof threading the gap. The coil is mounted for reciprocal movement along the central leg in response to a propelling force developed on the coil by driving a current therethrough. In order to minimize inductance, a bucking coil is also wound around the central leg and connected in series opposition to the movable drive coil.

BACKGROUND OF THE INVENTION

Field of the invention

The present invention relates to electric motors capable of providing linear movement.

More particularly, the present invention relates to linear motors suitable for use in applications where high speed, accuracy and relatively long strokes are required. One such application is as a linear positioner in a magnetic disc memory. Such memories employ magnetic discs which may have as many as twelve hundred concentric tracks recorded on a surface having a twelve inch radius. In such memories, a head carrying arm is provided adjacent each disc surface. The arm may, for example, carry only four heads so that it is necessary to be able to move the arm radially three inches with respect to the disc in order to position a head adjacent to a selected track. It will be appreciated that such applications require extremely accurate positioning resolutions. Moreover, inasmuch as the head positioning time constitutes a significant portion of the overall memory access time, it will also be appreciated that rapid positioning is extremely important. A further requirement of a linear positioner for use in a disc memory system is that it have a relatively long stroke, e.g. more than one inch, in order to minimize the number of heads required per disc surface.

Description of the prior art

The prior art discloses many linear positioning devices intended for use in magnetic disc memory systems; e.g., see U.S. Patent No. 3,134,880 and U.S. Patent No. 3,314,057. Although such prior art devices may function adequately in many types of disc memories, they gradually become unsatisfactory as track density requirements increase and positioning time requirements decrease.

SUMMARY OF THE INVENTION

In view of the foregoing, it is an object of the present invention to provide a fast and accurate linear motor capable of providing a reasonably long stroke.

In accordance with the present invention, a motor is provided which includes a magnetic core structure defining an air gap around a central leg. Means are provided for developing a substantially uniform magnetic field through the gap. A movable drive coil is concentrically disposed around the central leg with the turns thereof threading the gap so that a current driven through the coil will develop a propelling force on the coil structure sufficient to move it along the central leg.

In accordance with a significant feature of the invention, in order to minimize the inductance of the drive coil to permit rapid current changes, a bucking coil is also wound around the central leg and connected to the drive coil so as to minimize the flux in the central leg. Another significant feature resulting from the introduction of the bucking coil is the reduction in the net external magnetic field produced by the drive coil.

In accordance with a preferred embodiment of the invention, the bucking coil is fixedly mounted and disposed concentrically around the central leg. In accordance with an alternative embodiment of the invention, the bucking coil can also be mounted for movement along the central leg.

In accordance with a still further aspect of the present invention, embodiments of the invention can be utilized as linear tachometers in which a moving carriage carries a sense coil (corresponding to the motor drive coil) through the gap to induce a voltage thereacross. The use of a bucking coil in such embodiments reduces the sensitivity of the tachometer to external magnetic fields.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
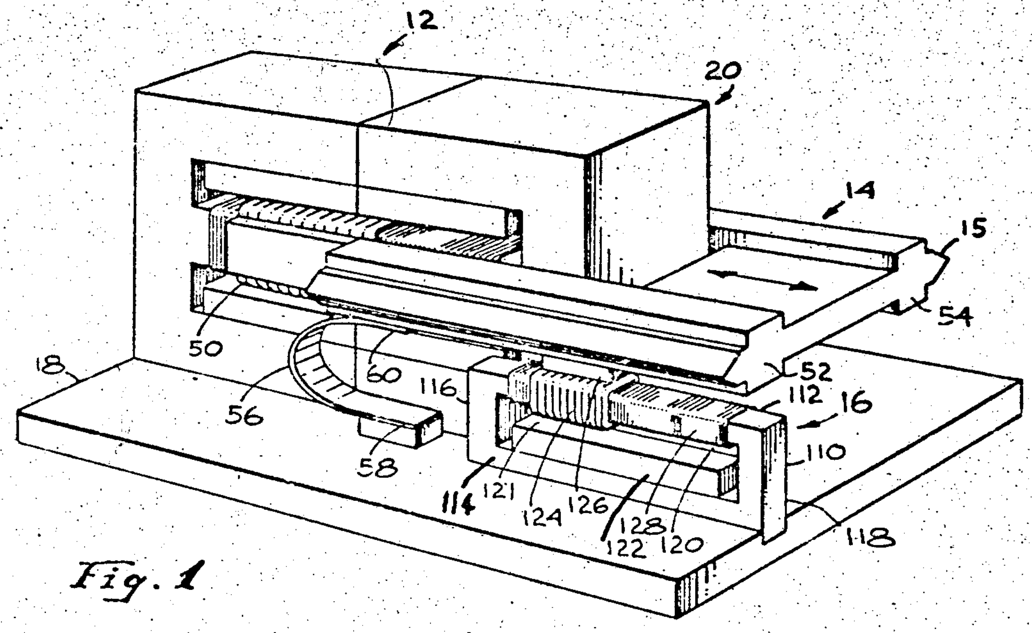
FIGURE 1 is a perspective view of a linear positioner for use in a magnetic disc memory system which employs a linear motor in accordance with the present invention.

Attention is now called to FIG. 1 which illustrates a linear positioner in accordance with the present invention. Although the linear positioner of FIG. 1 is intended primarily to be utilized for positioning magnetic heads in a disc memory system, it will be readily recognized that the apparatus is suitable for use in many other applications.

The linear positioner of FIG. 1 includes a linear motor 12 capable of driving a rigid carriage structure 14. The carriage structure can be provided with tracks 15 adapted to ride in mating channels or ball bearings (not shown) to constrain the carriage movement to a linear direction. The linear positioner of FIG. 1 also includes a linear tachometer 16, which, as will be seen hereinafter, operates upon substantially the same principles as does the linear motor 12. The motor 12 and tachometer 16 are supported on a suitable base 18.

Figure 2:
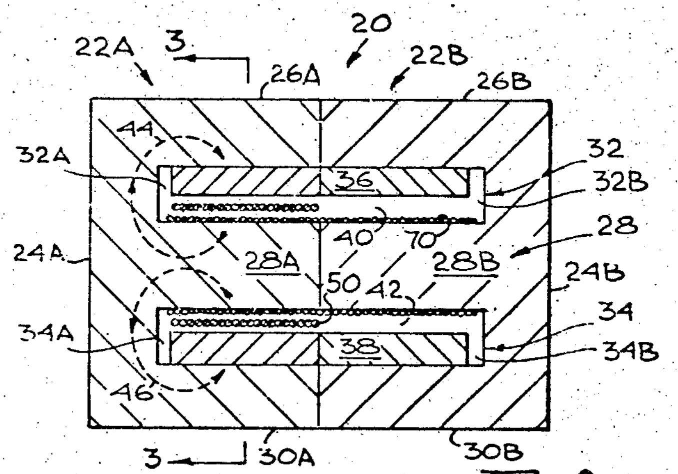
FIG. 2 is a vertical sectional view taken through the linear motor of FIG. 1.
Figure 3:
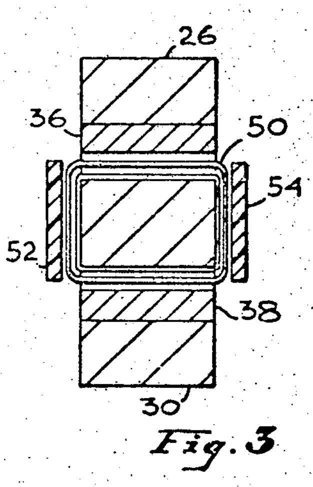
FIG. 3 is a vertical sectional view taken substantially along the plane 3—3 of FIG. 2.

The motor 12 is comprised of a soft iron core structure 20. The core structure 20, as is best shown in FIGS. 2 and 3, may be formed from two oppositely oriented E-shaped portions 22A and 22B. Core structure portion 22A includes a vertical leg 24A, an upper leg 26A, a central leg 28A, and a lower leg 30A. Similarly, core structure portion 22B has a vertical leg 24B, an upper leg 26B, a central leg 28B, and a lower leg 30B. Upper passages 32A and 32B respectively space the upper legs 26A and 26B from the central legs 28A and 28B. Similarly, lower passages 34A and 34B respectively space the lower legs 30A and 30B from the central legs 28A and 28B.

The core structure portions 22A and 22B are oriented with respect to each other as shown in FIG. 2 with the faces of the free ends of the upper, central, and lower legs in intimate contact with each other. Hereinafter, the composite core structure 20 will be referred to as being comprised of an upper leg 26, a central leg 28, and a lower leg 30, and vertical legs 24A and 24B. The upper and lower passages through the composite core structure 20 will be referred to respectively by the numerals 32 and 34.

It will be appreciated that although the core structure 20 has been illustrated in FIGS. 1 and 2 as being comprised of two E-shaped portions, it could in fact be comprised of a lesser or greater number of portions depending upon the manufacturing techniques selected.

In accordance with the present invention, means are provided for establishing a magnetic field in the passages 32 and 34 which extend substantially parallel to the vertical legs 24A and 24B. In accordance with the preferred embodiment of the invention, permanent magnets 36 are secured to the underside of the upper leg 26 within the passage 32. Similarly, permanent magnets 38 are secured to the upperside of the lower leg 30 within the passage 34. The vertical dimensions (as shown in FIG. 2) of the permanent magnets 36 and 38 are less than the vertical dimensions of the passages 32 and 34 to thereby respectively define gaps 40 and 42. That is, gap 40 is defined between the permanent magnets 36 and the central leg 28, and gap 42 is defined between the permanent magnets 38 and the central leg 28. The permanent magnets 36 and 38 are oriented so as to create magnetic fields extending either into or out of the central leg 28. The dotted lines 44 and 46 in FIG. 2 represent magnetic flux lines, which originate at the permanent magnets and extend into the central leg 28, and then through the vertical leg 24A to either the upper leg 26 or lower leg 30. As will be better appreciated hereinafter, a linear motor in accordance with the present invention will satisfactorily operate if the magnetic fields both extend in an opposite direction, that is, from the central leg 28 across the gaps to the permanent magnet.

In accordance with the invention, a substantially rigid multiturn drive coil 50 is wound on a coil form 51 concentrically disposed around the central leg 28. The drive coil 50 and form 51 together form a rigid structure which is secured between a pair of carriage side frame members 52 and 54. The carriage side frame members 52 and 54 may be formed of a variety of materials which are of a size and shape enabling them to be light in weight but stiff. The load to be driven may be connected to the carriage 14 opposite the drive coil 50 end. Current is conducted to the movable coils through flexing members 56. Only one of the flexing members is illustrated in FIG. 1. The flexing members 56 leave a first end 58 anchored to but insulated from the base 18. A second end 60 is secured to but insulated from a side frame member of the carriage 14. The characteristics of the flexing members are selected to provide a low resistance connection to the drive coil and to provide a negligible loading effect on the motion of the carriage.

In order for the drive coil 50 to be movable along the central leg 28, its length, of course, must be shorter than the length or longitudinnal dimension of the central leg 28. Thus, as shown in FIGS. 1 and 2, the longitudinal dimension of the coil 50 can be approximately one-half the longitudinal dimension of the central leg 28. Thus, for example, if the longitudinal dimension of the central leg is four inches, the coil 50 can have a longitudinal dimension of two inches with the difference (two inches) constituting the stroke length.

In order to physically motivate the drive coil 50 and carriage 14 rigidly coupled thereto an electrical current is driven through the drive coil which interacts with the magnetic field through the gaps 40 and 42 to develop a force on the coil structure which acts parallel to the longitudinal dimension of the central leg 28. In accordance with the preferred embodiment of the invention, the supporting leaf springs 56 are electricallly conductive and a source of potential is connected thereacross to drive a current through the drive coil 50. The explanation of the electrical connections between the leaf springs 56, the drive coil 50, and a bucking coil to be introduced will be discussed subsequently in conjunction with the explanation of FIGS. 4 and 5.

It has previously been pointed out that in order to be useful in the contemplated applications, the motor should be very fast, and have a reasonably long stroke. In order for the motor to be fast, the lateral dimension of the gaps 40 and 42 should be large, since the magnitude of the force developed on the coil structure is substantially proportional to the length of conductor of coil 50 within the gaps. In order to maximize the magnetic field intensity through the gap, the vertical gap dimension should be as small as possible. Although the embodiment of the invention thus far described will operate as a linear motor, it may not be quite fast enough to satisfy certain application requirements. It should be appreciated that response speed is directly related to the rise time of the leading edge of the drive coil current. That is, if the drive coil current increases to its rated value very quickly, the physical response of the drive coil structure will be very rapid. On the other hand, if the drive coil current rise time is slow, the physical response of the drive coil structure will be correspondingly slow.

In order to enable the rise time of the drive coil current to be very rapid, it is necessary to minimize the drive coil inductance. Unfortunately, this requirement is inconsistent with the motor structure thus far recited because the drive coil will establish flux in the central leg 28, thereby causing the drive coil inductance to be larger than if the central leg were absent. In addition, the flux established by the drive current might saturate some parts of the magnetic path, especially near the ends of the central leg. Another reason for desiring inductance to be minimized is to reduce the net external magnetic field set up by the drive coil.

In accordance with a significant feature of the present invention, in order to minimize the drive coil inductance, a bucking coil 70 is wound around the central leg 28. The bucking coil 70 in the embodiment of FIGS. 1–3 is stationary and is essentially concentric with but smaller than the drive coil 50. The bucking coil 70 is connected in series with the drive coil 50 and is wound so as to produce a field in the central leg 28 opposite to that produced by the drive coil 50. Thus, the coil 70 will have the effect of reducing the net flux in leg 28 and therefore the net inductance of the two coils in series will be less than either coil by itself.

Figure 4:
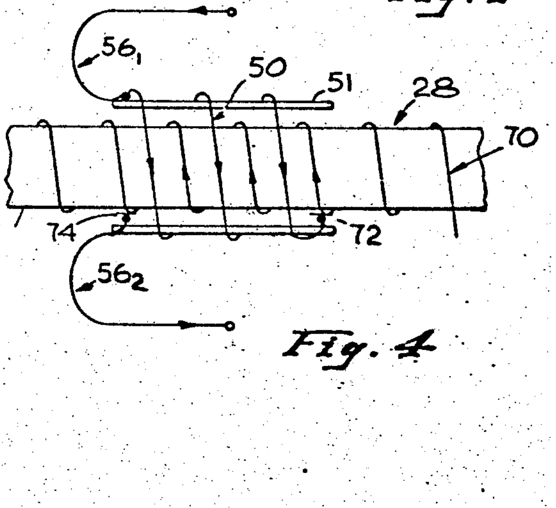
FIG. 4 is a schematic diagram illustrating one form of electrical interconnection between the movable drive coil and stationary bucking coil of the motors of FIGS. 1–3.

The stationary bucking coil 70 may be wound along the entire length of the central leg 28 with the same pitch as that of the movable drive coil 50. As shown in FIG. 4, one end of the movable drive coil 50 can be connected to one of the lead springs $56_1$. The second end of the drive coil 50 can be connected to a movable contact or brush 72, which is ganged with a second brush 74. The brushes 72 and 74, respectively, contact insulation-free areas of the stationary bucking coil 70. The brush 74 is electrically connected to the second leaf spring $56_2$. A current source is intended to be connected between the free ends of springs $56_1$ and $56_2$ to provide a current through the coils as represented by the arrows.

The movable brushes 72 and 74 are carried by coil form 51 and are positioned so that for any position of the movable coil 50, a corresponding portion of the stationary bucking coil 70 will be energized. That is to say, the flux in the portion of the central leg 28 surrounded by the movable coil 50 will always be minimized by the combined effect of the coil 50 and that portion of the coil 70 selected by the movable contacts 72 and 74. As a consequence of the coil 50 and active portion of the coil 70 producing opposite effects, the next flux produced by the two coils in the center leg will be very much reduced over what either alone would produce. In fact, the inductance can be made substantially less than the air core inductance of the movable coil.

Figures 5, 6, 7:
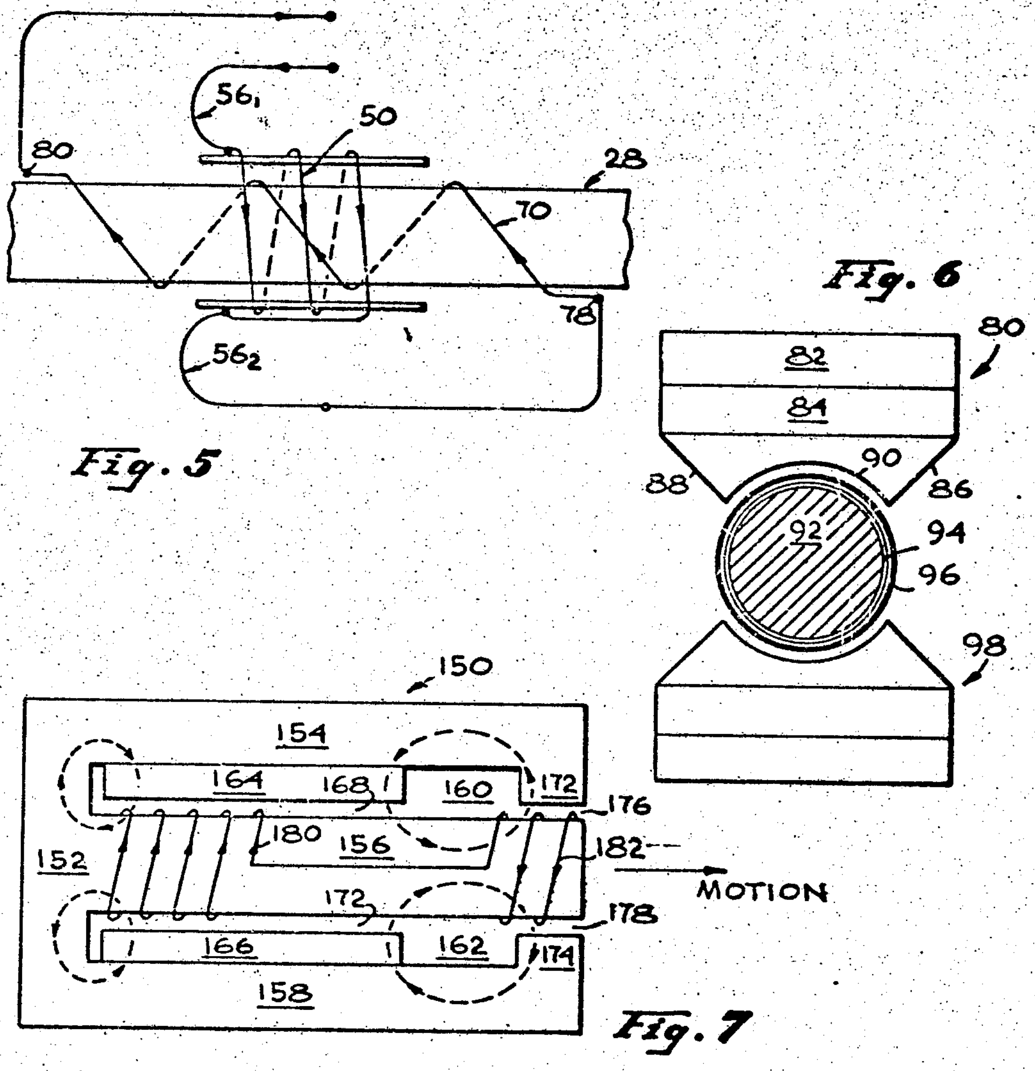
FIG. 5 is a schematic diagram illustrating an alternate form of interconnection between the movable drive coil and stationary bucking coil of the motor of FIGS. 1–3.
FIG. 6 is a vertical sectional view illustrating a further embodiment of the invention.
FIG. 7 is a schematic representation of a further embodiment of the invention.

Although the arrangement shown in FIG. 4 yields excellent results, it requires the utilization of brushes which are sometimes objectionable because of cost, friction, space, and maintenance requirements. An alternate solution which does not require brushes and which is normally quite acceptable from a performance standpoint, is to place the same number of turns on the stationary coil as are on the drive coil, but to spread them out over perhaps twice the length of the drive coil. That is, as shown in FIG. 5, one end of the drive coil 50 is again connected to leaf spring $56_1$. The second end of the drive coil 50 is connected to the leaf spring $56_2$. The anchored end of the leaf spring $56_2$ is connected to the terminal 78 of the stationary coil 70 in FIG. 5. Whereas a current source was intended to be connected between the leaf springs $56_1$ and $56_2$ in FIG. 4, in the embodiment of FIG. 5, it is connected between the leaf spring $56_1$ and terminal 80 of the stationary coil 70 to thus drive a current through coils 50 and 70 in the direction of the arrows. The arrangement in FIG. 5 results in a motor with a larger terminal inductance than that illustrated in FIG. 4 but which is still low enough to be acceptable for many applications.

It has previously been pointed out that in order to develop the maximum force on the movable coil, as high a magnetic flux concentration as is possible should be developed in the gap, and as much of the drive coil conductor as is possible should be disposed within the gap. FIG. 6 illustrates a cross section of an alternative embodiment of the invention which is designed to maximize the flux concentration and percentage of the drive coil within the gap. In the embodiment of FIG. 6, the upper composite leg 80 is comprised of a plate of iron 82 disposed on top of a permanent magnet assembly 84. An additional iron member 86 is disposed beneath the magnet assembly 84. The iron member 86 has tapered sides 88 which tend to concentrate the flux therethrough to the concave face 90 shaped to substantially conform to a cylindrical central leg 92. A bucking coil 94 is wound directly about the leg 92 and a movable drive coil 96 is disposed around the coil 94. A composite lower leg 98 is disposed on the other side of the central leg 92 and is constructed identically to the leg 80.

By utilizing the cylindrical central leg 92 of FIG. 6, a greater percentage of the coil conductor is disposed within the gap. Additionally, by shaping the iron members 86 as shown in FIG. 6, the flux concentration within the gap is maximized. These two effects together assure that a maximum force is developed on the drive coil which in turn assures high acceleration of the carriage.

Attention is now again called to FIG. 1 and, more particularly, to the linear tachometer 16. In certain applications of linear positioning devices, it is desirable to monitor the velocity of the carriage in order, for example, to determine when it has reached zero. The linear tachometer 16 of FIG. 1 is capable of performing this function and operates upon substantially the same principles as the linear motor 12. More particularly, the tachometer 16 includes a core structure 110 comprised of upper and lower legs 112 and 114 and vertical legs 116 and 118. The legs define a passage 120 extending therethrough. Means for creating a magnetic field such as permanent magnets 122 are disposed within the passage 120 to establish a magnetic field in the gap 121 between the magnet assembly 122 and the leg 112.

A sense coil 124 (corresponding to the drive coil in motor embodiments) loosely envelops leg 112. The coil 124 is secured to stud 126 of the carriage 14. A stationary bucking coil 128 is wound directly on the leg 112 and is connected to the coil 124 so as to develop an oppositely directed field through leg 112. In the operation of the tachometer, as the carriage is moved linearly in response to the force developed on the motor drive coil structure, the turns of the sense coil 124 will cut the flux lines within the gap 121, thereby generating a voltage in the coil 124 which is related to the linear velocity of the coil 124 and carriage 14. By monitoring the output voltage provided by the coil 124, the velocity of the carriage 14 will be known. It is pointed out that a feature of the tachometer construction as shown in FIG. 1 is that the output voltage developed on the sense coil 124 will be insensitive to any lateral movement of the coil 124 or in other words, the output voltage will be related only to longitudinal motion along the leg 112. Utilization of the bucking coil 128 in the tachometer considerably reduces the sensitivity of the output voltage to any noise magnetic fields since such fields would induce opposite effects in the windings 124 and 128 and thereby cancel each other out.

Attention is now called to FIG. 7 which diagrammatically illustrates a still further embodiment of the invention which makes more efficient use of the fields set up by the permanent magnets. Although a linear motor is illustrated in FIG. 7, it will be appreciated that the features introduced therein can also be utilized in tachometer embodiments of the invention. Briefly, the concept introduced in the embodiment of FIG. 7 is to form a gap in one of the vertical legs (e.g. leg 24B of FIG. 2) of the core structure and to utilize the return flux therethrough bp providing a movable bucking coil within the gap as an auxiliary drive coil.

More particularly, the embodiment of FIG. 7 utilizes a core structure 150 comprised of a vertical leg 152, an upper leg 154, a central leg 156, and a lower leg 158. Passages 160 and 162 are respectively defined between the legs 154 and 156 and the legs 156 and 158. Permanent magnets 164 and 166 are respectively mounted on the underside of leg 154 in passage 160 and the upper side of leg 158 in passage 162 thus defining gaps 168 and 170. The core structure 150 thus far recited is identical to the core structure 20 of FIG. 2. It differs therefrom however in that the upper central and lower legs are longer and extend further from the left vertical leg. Additionally, in lieu of using a right vertical leg to bridge legs 154, 156 and 158, pole pieces 172 and 174 are provided which respectively project toward central leg 156 but define gaps 176 and 178 therebetween. It should be readily appreciated that the magnets 164 will establish oppositely directed flux lines through the gaps 168 and 176 as, for example, are represented by the dotted arrow lines. Similarly, magnets 166 will establish oppositely directed flux lines through gaps 170 and 178 as shown by the dotted arrow lines. It will be noted that the flux lines through the gaps 168 and 170 are directed toward the central leg 156 and the flux lines across the gaps 176 and 178 are directed away from central leg 156.

A drive coil 180 is concentrically wound around central leg 156 threading gaps 168 and 170. A bucking coil 182, having a winding sense opposite to coil 180, is also concentrically wound around central leg 156. The drive coil 180 and bucking coil 182 are electrically connected in series. Additionally, the coils 180 and 182 are formed into a rigid structure which is mounted for reciprocal movement along the central leg 156.

It will be apparent that by driving a current through serially connected coils 180 and 182, forces will be developed on both of the coils which act in the same direction along central leg 156. For example, if a current is driven through the coils in the direction of the arrows, a propelling force to the right will be developed on both coils 180 and 182. Thus, the force developed on the bucking coil 182 aids the force developed on drive coil 180. Nevertheless, the two coils in series will define a lower inductance than either one alone. Moreover, the coils will develop oppositely directed fields in the central leg 156 and will therefore both prevent saturation therein and minimize the generation of external fields.

Figure 8:
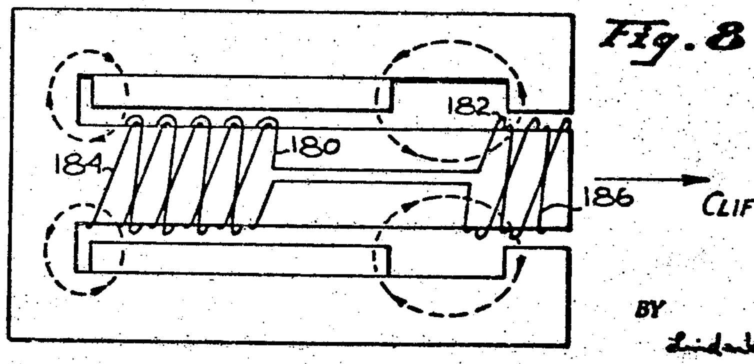
FIG. 8 is a schematic representation of a still further embodiment of the invention.

Although the utilization of the bucking coil in FIG. 7 yields a net inductance lower than the inductance which would be provided by the drive coil alone, it still may not be low enough for certain applications. In order to lower the inductance further while retaining the use of the return path gaps 176 and 178, a pair of additional stationary bucking coils can be concentrically wound on the central leg 156 as shown in FIG. 8. More particularly, in the embodiment of FIG. 8, a stationary bucking coil 184 is wound on the central leg 156 immediately beneath the drive coil 180. The coil 184 is wound opposite to the coil 180. Additionally, a stationary bucking coil 186 is wound on the central leg 156 beneath the movable bucking coil 182. The winding sense of coil 186 is opposite to that of coil 182. The coils 184 and 186 can be spread out over the path length of coils 180 and 182 respectively in the manner previously discussed in conjunction with FIG. 5 or alternatively a moving brush arrangement can be used of the type previously discussed in conjunction with FIG. 4. That is, by utilizing moving brushes, the portion of each of the stationary coils immediately adjacent to the movable coils for any position thereof can be energized to achieve optimum bucking.

From the foregoing, it should be appreciated that several embodiments of linear motor and tachometer constructions have been disclosed herein which are characteristically very fast and accurate and which are able to provide a relatively long stroke.

The embodiments of the invention in which an exclusive property or privilege is claimed are defined as follows:

1. A linear motion device comprising:
- a core structure defining a gap having substantially perpendicular longitudinal, lateral, and vertical dimensions;
- a permanent magnet having substantially perpendicular longitudinal, lateral, and vertical dimensions and having parallel pole faces spaced by said magnet vertical dimensions, said magnet longitudinal and lateral dimensions being substantially equal to said gap longitudinal and lateral dimensions, respectively;
- means supporting said permanent magnet on said core structure for establishing a magnetic field across said gap extending substantially parallel to said gap vertical dimension and of substantially uniform intensity along said gap longitudinal dimensions;
- a rigid drive coil structure comprised of a plurality of turns of a first conductor elongated in the direction of said gap lateral dimension and at least partially disposed in said gap; and
- means supporting said drive coil structure for reciprocal movement in the direction of said magnet and gap longitudinal dimensions, the dimension of said drive coil structure in a direction parallel to said longitudinal dimensions being smaller than said magnet longitudinal dimension.

2. The device of claim 1 wherein said gap longitudinal dimension is substantially larger than said gap vertical dimension.

3. The device of claim 1 including a second conductor disposed in said gap and elongated in the direction of said lateral dimension; and
- means interconnecting said first and second conductors so as to develop oppositely directed magnetic fields in said core structure in response to the application of current to said conductors.

4. A linear motion device comprising:
- a core structure including a central leg and upper and lower legs spaced therefrom to respectively define parallel upper and lower main gaps each having longitudinal, lateral, and vertical dimensions;
- a rigid structure supported for reciprocal movement along said central leg parallel to said longitudinal dimension of said gaps, said structure including a drive coil concentrically wound around said central leg and threading said upper and lower main gaps, the dimensions of said drive coil along said central leg being smaller than the longitudinal dimensions of said gaps;
- permanent magnet means supported by said core structure establishing magnetic fields across said upper and lower main gaps each extending parallel to said gap vertical dimensions with both fields extending either toward or away from said central leg, each of said fields being of substantially uniform intensity along the longitudinal dimension of said gap; and
- means for applying current to said drive coil to thereby develop a force on said rigid structure tending to move it along said central leg.

5. The motor of claim 4 wherein said means for applying current to said drive coil includes first and second flexure members, each having first and second ends;
- means anchoring said first ends of said first and second flexure members relative to said core structure; and
- means electrically coupling said second ends of said first and second flexure members to said drive coil.

6. The motor of claim 4 including a stationary coil wound about said central leg; and
- means connecting said drive coil in series with said stationary coil so that a current therethrough develops oppositely directed magnetic fields in said central leg.

7. The motor of claim 6 wherein said stationary coil has a greater number of turns than said drive coil and wherein said turns of said stationary aid drive coils are of substantially the same pitch.

8. The motor of claim 7 wherein said means connecting said drive coil to said stationary coil includes movable contact means for connecting substantially the same number of turns in said stationary coil in series with said drive coil as there are turns in said drive coil.

9. The motor of claim 6 wherein said stationary coil extends a greater distance along said longitudinal dimension than does said drive coil.

10. The motor of claim 9 wherein the turns of said stationary coil have a greater pitch than the turns of said drive coil.

11. A linear motion device comprising:
- a core structure including a central leg and upper and lower legs spaced therefrom to respectively define upper and lower main gaps;
- a rigid structure supported for reciprocal movement along said central leg, said structure including a drive coil concentrically wound around said central leg and threading said upper and lower main gaps;
- means establishing magnetic fields across said upper and lower main gaps both extending either toward or away from said central leg;
- means for applying current to said drive coil to thereby develop a force on said rigid structure tending to move it along said leg; and
- pole pieces disposed on corresponding ends of said upper and lower legs projecting toward said central leg and defining upper and lower auxiliary gaps therebetween;

said rigid structure including an auxiliary drive coil concentrically wound around said central leg and threading said upper aid lower auxiliary gaps.

12. The linear motion device of claim 11 including means interconnecting said drive coil and said auxiliary drive coil so as to develop oppositely directed magnetic fields in said central leg, 13. The linear motion device of claim 11 wherein said drive coil and said auxiliary drive coil are connected in series and are wound with an opposite sense relative to one another.

14. The linear motion device of claim 13 including first and second stationary bucking coils wound on said central leg adjacent to said drive coil and said auxiliary drive coil respectively, said first and second bucking coils respectively having winding senses opposite to that of said drive and auxiliary drive coils; and means connecting said first and second bucking coils in series with said drive coil aid said auxiliary drive coil.

References Cited

UNITED STATES PATENTS

| | | | |
|---|---|---|---|
| 3,161,793 | 12/1964 | Laithwaite | 310—27 |

| | | | |
|---|---|---|---|
| 3,149,254 | 9/1964 | Carter et al. | 310—12 |
| 509,705 | 11/1893 | Threlfall | 318—131 XR |
| 2,328,337 | 8/1943 | Hanchock | 310—27 |
| 3,074,269 | 1/1963 | Wohl | 310—27 XR |
| 3,176,170 | 3/1965 | Fulton et al. | 310—12 |
| 3,135,880 | 6/1964 | Olson et al. | 310—14 |
| 3,374,409 | 3/1968 | Gorka | 310—27 XR |
| 2,938,151 | 5/1960 | Bowditch | 310—27 XR |

FOREIGN PATENTS

| | | |
|---|---|---|
| 1,272,951 | 8/1961 | France. |

OTHER REFERENCES

IBM, Tech. Dis. Bulletin, vol. 4, No. 3, 8/61, Smeltzer, Linear Actuator," 310/13.

MILTON O. HIRSHFIELD, Primary Examiner

B. A. REYNOLDS, Assistant Examiner

U.S. Cl. X.R.

310—14; 318—135